US008490098B2

(12) United States Patent
Chen et al.

(10) Patent No.: US 8,490,098 B2
(45) Date of Patent: Jul. 16, 2013

(54) CONCOMITANCE SCHEDULING COMMENSAL THREADS IN A MULTI-THREADING COMPUTER SYSTEM

(75) Inventors: Ying Chen, Beijing (CN); Yi Ge, Beijing (CN); Rui Hou, Beijing (CN); Liang Liu, Beijing (CN); Xiao Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1215 days.

(21) Appl. No.: 12/348,933

(22) Filed: Jan. 6, 2009

(65) Prior Publication Data
US 2009/0178054 A1    Jul. 9, 2009

(30) Foreign Application Priority Data
Jan. 8, 2008  (CN) .......................... 2008 1 0002270

(51) Int. Cl.
*G06F 9/46*    (2006.01)
(52) U.S. Cl.
USPC .......................................... 718/102; 718/106
(58) Field of Classification Search
USPC .......................................... 718/100, 102, 106
See application file for complete search history.

(56) References Cited

U.S. PATENT DOCUMENTS

| 6,247,027 | B1 * | 6/2001 | Chaudhry et al. ..................... 1/1 |
| 6,684,398 | B2 * | 1/2004 | Chaudhry et al. ............ 718/106 |
| 6,704,862 | B1 * | 3/2004 | Chaudhry et al. ............ 712/244 |
| 6,721,944 | B2 * | 4/2004 | Chaudhry et al. ............ 717/154 |
| 6,732,363 | B1 * | 5/2004 | Chaudhry et al. ............ 719/318 |
| 6,928,645 | B2 * | 8/2005 | Wang et al. .................... 718/102 |
| 7,168,076 | B2 * | 1/2007 | Chaudhry et al. ............ 718/106 |
| 7,313,676 | B2 * | 12/2007 | Brekelbaum et al. ......... 712/217 |
| 7,328,433 | B2 * | 2/2008 | Tian et al. ..................... 717/149 |
| 7,350,027 | B2 * | 3/2008 | Gara et al. ..................... 711/121 |
| 7,398,521 | B2 * | 7/2008 | Hoflehner et al. ............ 717/151 |
| 7,458,065 | B2 * | 11/2008 | Sanchez et al. ............... 717/131 |
| 2003/0018826 | A1 * | 1/2003 | Chaudhry et al. ............ 709/310 |
| 2004/0078780 | A1 | 4/2004 | Dutt et al. |
| 2005/0081207 | A1 * | 4/2005 | Hoflehner et al. ............ 718/100 |
| 2005/0108695 | A1 | 5/2005 | Li et al. |
| 2005/0188364 | A1 | 8/2005 | Cockx et al. |
| 2006/0064692 | A1 * | 3/2006 | Sanchez et al. ............... 718/100 |
| 2007/0074217 | A1 | 3/2007 | Rakvic et al. |

FOREIGN PATENT DOCUMENTS

CN    1853165    10/2006

OTHER PUBLICATIONS

Johnson, et al., "Min-Cut Program Decomposition for Thread-Level Speculation", School of Electrical & Computer Engineering Purdue University,Jun. 2004.
Cong, et al., "Accerlerating Sequential Applications on CMPs Using Core Spilling", vol. 18, Issue 8, pp. 1094-1107, Aug. 2007.
Mitsuhisa Sato, et al., "Thread-Based Programming for the EM-4 Hybrid Dataflow Machine", Electrotechnical Laboratory, pp. 146-155, 1992.

* cited by examiner

*Primary Examiner* — Van Nguyen
(74) *Attorney, Agent, or Firm* — Eustus Dwayne Nelson; Anne Vachon Dougherty

(57)    ABSTRACT

A method and an apparatus for concomitance scheduling a work thread and assistant threads associated with the work thread in a multi-threading processor system. The method includes: searching one or more assistant threads associated with the running of the work thread when preparing to run/schedule the work thread; running the one or more assistant threads that are searched; and running the work thread after all of the one or more assistant threads associated with the running of the work thread have run.

21 Claims, 24 Drawing Sheets

CONCOMITANCE SCHEDULING COMMENSAL THREADS IN A MULTI-THREADING COMPUTER SYSTEM

CROSS REFERENCE TO RELATED APPLICATION

This application claims priority under 35 U.S.C. 119 from Chinese Patent Application No. 200810002270.0 filed Jan. 8, 2008, the entire contents of which are incorporated herein by reference.

BACKGROUND OF THE INVENTION

1. Field of the Invention

The present invention relates to computer technology, in particular, to a method and an apparatus for concomitance scheduling multiple commensal threads, such as a work thread and assistant threads associated therewith, in a multi-core/multi-threading computer system.

2. Description of Related Art

As the application of computers has become increasingly popular, the need by users for processing capability of computers is increasing exponentially. In modern processor design, multi-core/multi-threading technology is becoming the mainstream technology. Current mainstream CPU manufacturers all have adopted multi-core/multi-threading architecture in their higher performance commercial chips. Examples of multi-threading processors are IBM Power series, Intel Core Duo series and AMD Barcelona series. There is a Thread Level Parallelism (TLP) technology allowing the processing unit to have higher throughput by sharing the execution resources of the processor while executing multiple threads, and increasing the utilization ratio of the CPU.

One difference between a multi-core/multi-threading processor and the traditional multi-processor mainly lies in that multi-core/multi-threading processors have a plurality of hardware threads. The system can execute a plurality of threads at the same time. Another difference is that most multi-core/multi-threading processors share L2 or L3 cache between different cores and share L1 cache between different hardware threads.

Various methods of accelerating sequential programs are becoming known, and thread-level parallelization of sequential code is often regarded as an important method on multi-core/multi-threading platform. For example, see US patent application No. 2004/0078780A1 filed on Oct. 22, 2002, for extracting multiple threads from the original sequential thread. That system marks one or more blocks of code in an application coded for sequential execution, and inserts a marker at each of the one or more blocks for the marked code to suggest that block for potential concurrent execution. The execution time of the marked block is estimated according to the block duration weight of the marker and a path length of the block. The estimated execution time of each marked block and the overhead for scheduling concurrent threads are compared, then concurrent code is generated according to dependency information including the marker, and one or more of the marked blocks are transformed into corresponding concurrently executable tasks (threads).

Another way for extracting threads from the sequential code is automatic thread partition. Usually, a thread-partition compiler provides automatic multi-thread transformation of a sequential application program. When compiling the sequential application code, the compiler determines whether this sequential application code can be divided into at least two different functions, and then checks the integrity according to the data dependency. The code is split into multiple tasks automatically, and then the corresponding thread is generated. Once partitioned, the pluralities of application program threads are concurrently executed as respective threads of a multi-threaded architecture.

No matter which kind of assistant threads are used in the systems mentioned above, they are all functional and independent. For scheduling these kinds of assistant threads, operating systems don't need any change and treat them as normal threads. But another kind of assistant thread can be used to pre-fetch delinquent memory operations, or predict the hard-predicted branch instructions, or speculatively compute future codes ahead of original thread and so on. In essence, such speculative or assistant threads are closely-coupled with original sequential thread, and it is expected to simultaneously schedule these speculative or assistant threads. These speculative or assistant threads are also called commensal threads. For example, when the original work thread is being executed, no performance gain is expected if the pre-fetched thread is switched out.

Referring to FIG. 1, the schematic diagram of the process of sequential code being executed by an assistant thread having speculative function during data compression is shown. In FIG. 1, some assistant threads are first defined for the process of data compression while the system is running, e.g., by a hash function "=hash [hash-function (c)]", as indicated by part (a) of FIG. 1. While data compression is being performed, after the work thread running the data compression process is started, its assistant threads are started. In the case illustrated in part (b) of FIG. 1, the assistant threads must be scheduled with its work thread concurrently. Otherwise, the assistant threads will become useless even cause errors if they are not scheduled with its work thread concurrently.

Another way to accelerating single thread application on multi-core/multi-threading platform is to take advantage of the shared cache between different cores/hardware threads. FIG. 2 illustrates an example in which assistant threads of a work thread pre-fetched data from memory before the work thread needs them. In particular, when a program begins to run, assistant threads generated by the operating system seek out the memory reference instructions, such as Inst0, Inst1, Inst2, Inst3 and the Load instruction, then execute them. According to the method illustrated in FIG. 2, the load instruction are pre-fetched and the loaded data are stored in a shared cache; when the work thread begins to run subsequently, the load data are obtained directly from the shared cache instead of from memory system with lower frequency to accelerate the work thread. However, this method also requires that assistant thread is concurrently run with its work thread. Otherwise, the performance of work thread will not improve, it may even become worse.

In light of the above description of assistant thread scheduling technologies in related art, it can be understood that no matter which kind of assistant threads described above is adopted, assistant threads are needed to be scheduled or run together with their work thread. But in current mainstream operating systems, because an independent run-queue is built for each core/thread and every run-queue schedules threads independently and will be affected by load balance policy, it is hard to keep the closely-coupled relationship between work thread and its assistant thread.

FIG. 3A-3E illustrates a situation in which chaotic scheduling in traditional operating systems results from random scheduling between work thread and its assistant thread. These figures schematically show a situation in which Thread-1 and its assistant thread occur in the second run-queue at the same time. In multi-core/multi-threading operating systems, when threads are run according to the task list of operating system, run-queues operate normally in the order as shown in FIG. 3A-3D. But, at the next moment when Thread-1 enters into ready thread queue of queue 2 for running, as shown in FIG. 3E, Thread-1 and its assistant thread coexist in queue 2, causing chaos.

Unfortunately, the roles of such OS-related issues in practical design are rarely considered in current researches.

In light of the above description of thread scheduling technologies in prior art, it can be seen that in the thread scheduling methods used in the related art: 1) the scheduling for work thread and assistant threads associated therewith is random, i.e., when a operating system is running a work thread, the scheduling for assistant threads of this work thread is random; 2) after work thread begins to run, its assistant threads begin to run, and the running of these assistant threads are random. Thus, it may cause a chaotic thread scheduling.

SUMMARY OF THE INVENTION

This invention addresses defects existing in the prior art as follows: when preparing to run and/or schedule a work thread, based on the association between the work thread and its assistant threads, the operating system causes assistant threads of the work thread to be run first, and then runs the work thread itself. Thus, according to the invention, the method for concomitance scheduling work thread and assistant threads associated therewith improves the running speed of single thread and saves the system resources of CPU.

In particular, for solving defects existing in the prior art, the invention provides a method and an apparatus for concomitance scheduling multiple commensal threads in a multi-core platform.

According to the invention, there is provided a method for concomitance scheduling a work thread and assistant threads associated with the work thread in a multi-threading processor system. The method includes the steps of: searching one or more assistant threads associated with the running of the work thread when preparing to run/schedule the work thread; running the one or more assistant threads that are searched; and running the work thread after all of the one or more assistant threads associated with the running of the work thread have run.

The method summarized above, and the corresponding apparatus for concomitance scheduling work thread and assistant threads associated therewith, improve the running speed of single thread and save the system resources of CPU.

The invention preferably further includes: presetting the structure of each work thread and the structure of the assistant threads associated with the work thread by operating system so that the work thread and the assistant threads associated therewith are correlated. In preferred embodiment of the invention, for further accelerating the running speed of single thread and saving the system resources of CPU, the structures of work thread and assistant thread are further defined in order to enhance such association between work thread and assistant threads associated therewith.

According to the invention, there is also provided an apparatus for concomitance scheduling a work thread and assistant threads associated with the work thread in a multi-threading processor system. The apparatus includes: a searching means for searching one or more assistant threads associated with the running of the work thread when preparing to run/ schedule the work thread; a scheduling means for running the one or more assistant threads that are searched; wherein the scheduling means is further configured to run the work thread after all of the one or more assistant threads associated with the running of the work thread have run.

BRIEF DESCRIPTION OF THE DRAWINGS

The present invention itself, the preferred modes of making and using it, and other goals and advantages thereof will be more readily understand when referring to the detailed description of the illustrative embodiments in connection with the drawings, in which.

DETAILED DESCRIPTION OF THE PREFERRED EMBODIMENTS

The preferred embodiments of the present invention will be described in detail below with reference to the drawings.

Figure 1:
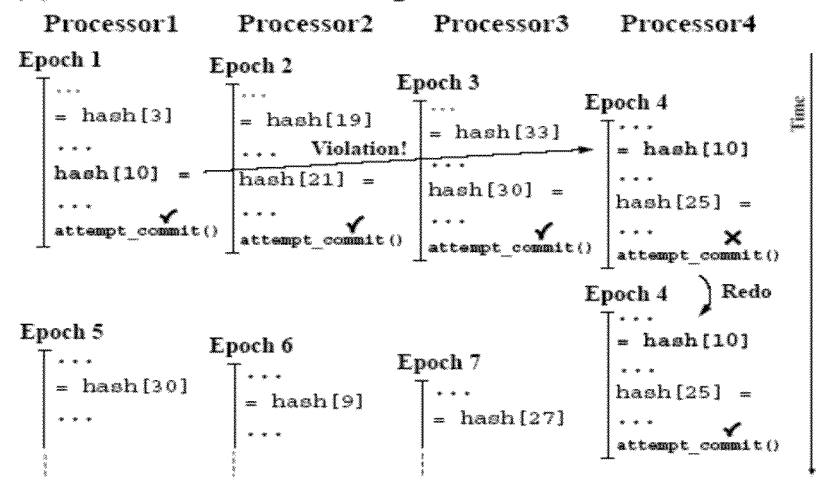
FIG. 1 is a schematic diagram of performing work thread scheduling scheme using speculative assistant threads in the related art.
Figure 2:
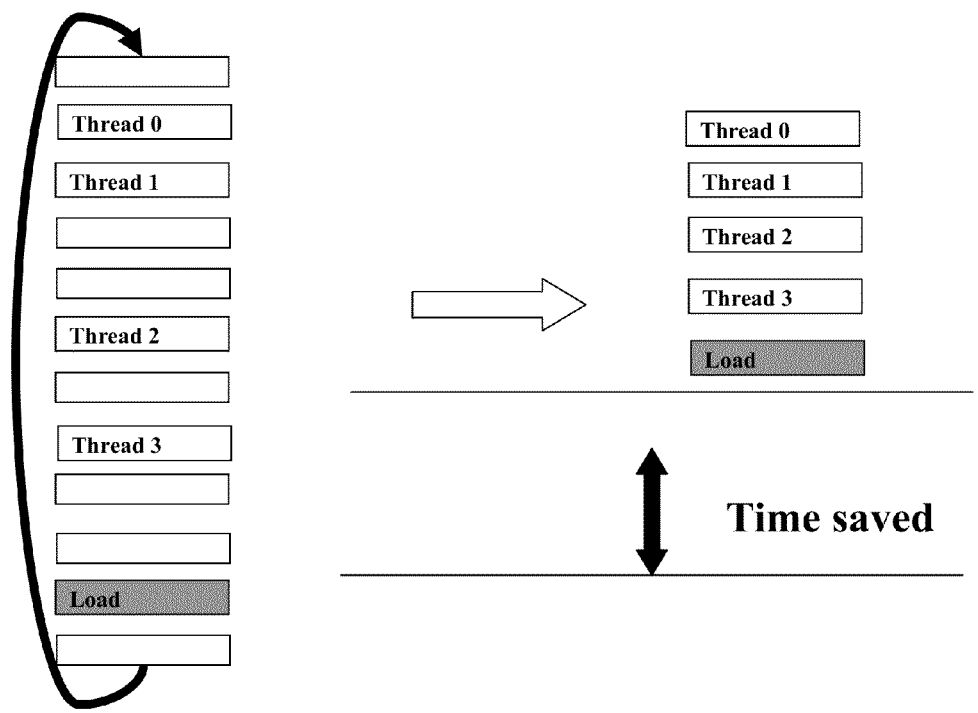
FIG. 2 is a schematic diagram of performing work thread scheduling scheme using pre-fetching assistant threads in the related art.
Figure 3A:
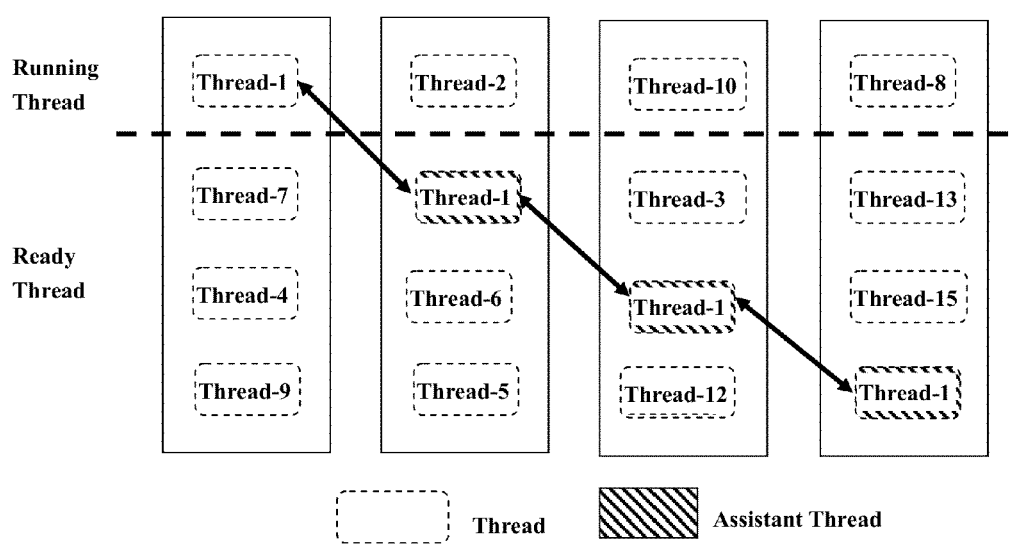
FIGS. 3A-3E show operation timing diagrams in which chaotic scheduling of work thread occurs according to the related art.
Figure 3B:
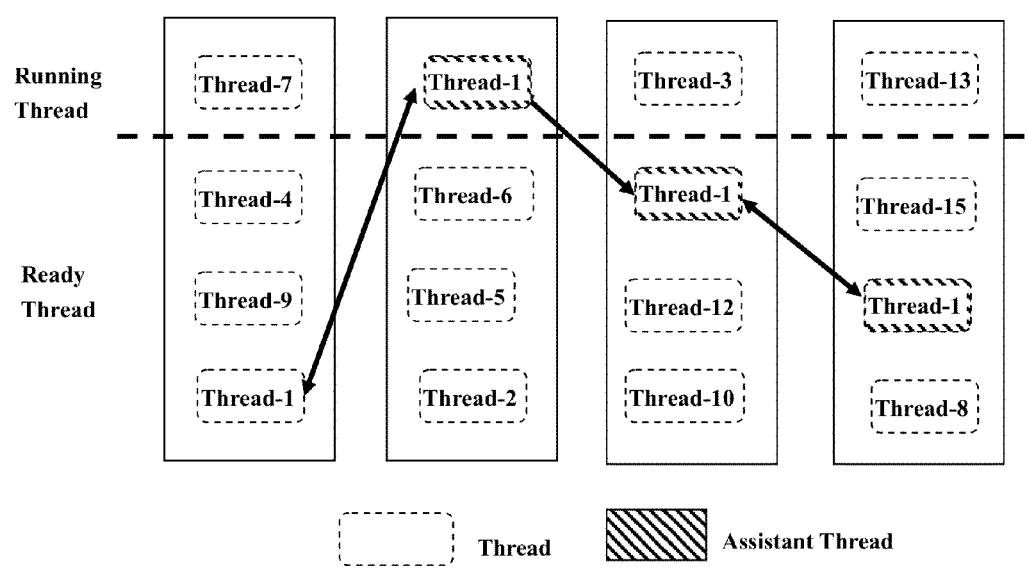
Figure 3C:
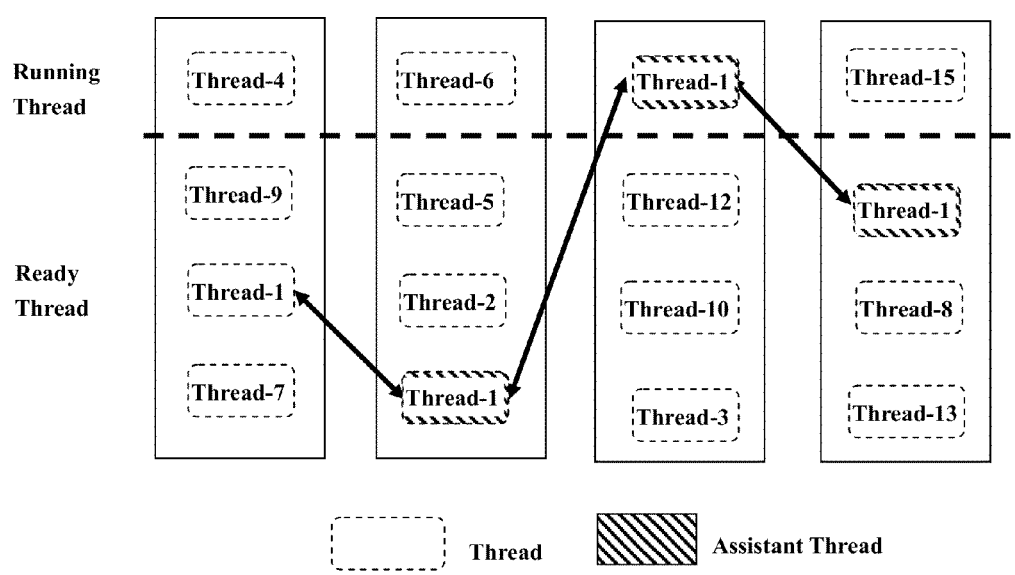
Figure 3D:
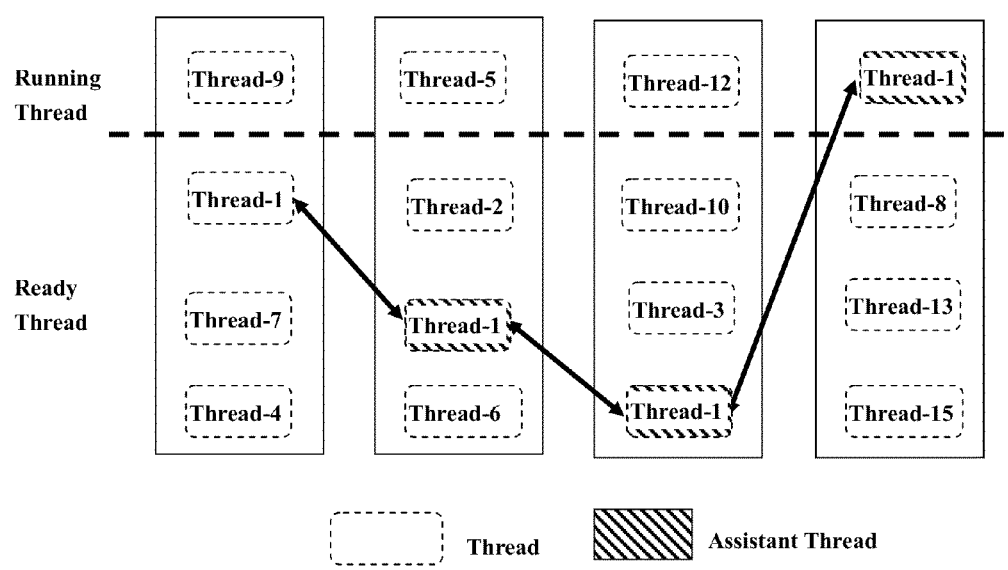
Figure 3E:
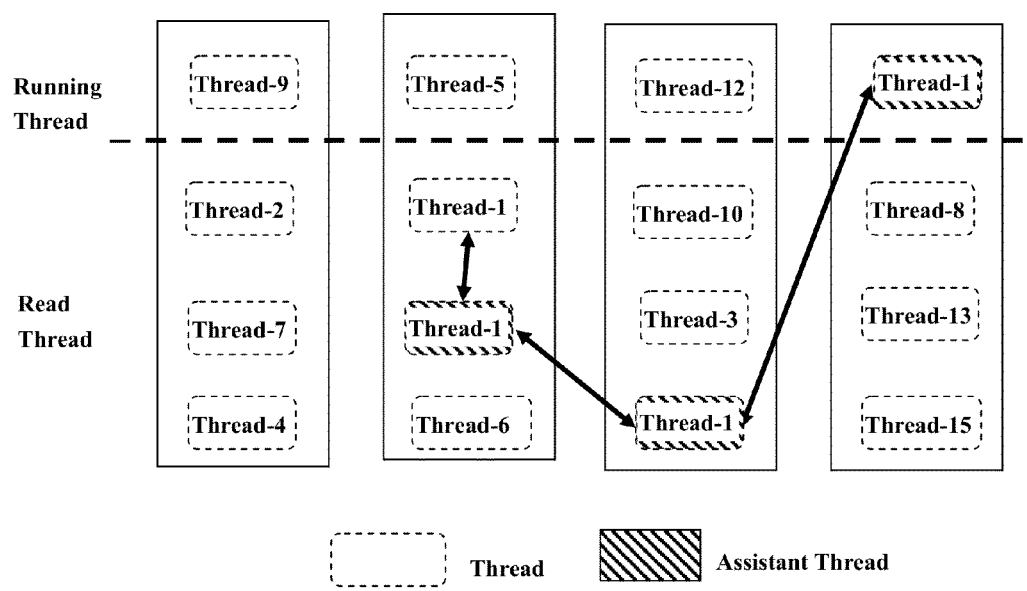
Figure 4:
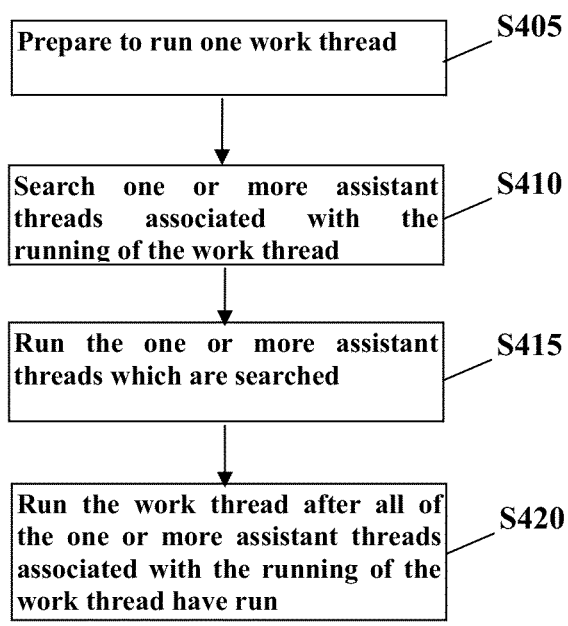
FIG. 4 is a schematic flowchart of a method for concomitance scheduling a single work thread and assistant threads associated therewith in a multi-core/multi-threading processor system according to the invention.

FIG. 4 shows a schematic flowchart of a method for concomitance scheduling a single work thread and assistant threads associated therewith in a multi-core/multi-threading processor system according to the invention.

When a work thread is prepared for running in step S405, the method for concomitance scheduling a single work thread and assistant threads associated therewith in a multi-core/multi-threading processor system according to the invention is started.

The process proceeds to step S410 where one or more assistant threads associated with the running of the work thread are searched.

After one or more assistant threads associated with the running of the work thread are searched, the method of the invention proceeds to step S415 where the one or more assistant threads which are searched begin to run. According to a preferred embodiment of the invention, after an assistant thread begins to run, the operating system will determine if the work thread has other assistant threads, and then begins to run the next assistant thread. When the operating system determines that all the assistant threads associated with the running of the work thread have begun to run, it begins to run the work thread, as shown in step S420. Assistant threads are run in a way so that all assistant threads associated with the running of the work thread are first scheduled into the run-queue of the operating system so as to be run with priority, and the work thread begins to run thereafter. Below, the operation for running work thread and assistant thread will be described in detail in connection to drawings and preferred embodiments.

A first preferred embodiment of the invention is described below with reference to FIGS. 5-9. In this preferred embodiment, the structure of each work thread and the structure of each assistant thread associated with the work thread are preset to be able to concomitance scheduling the assistant threads associated with the work thread while running/scheduling the work thread.

Figure 5A:
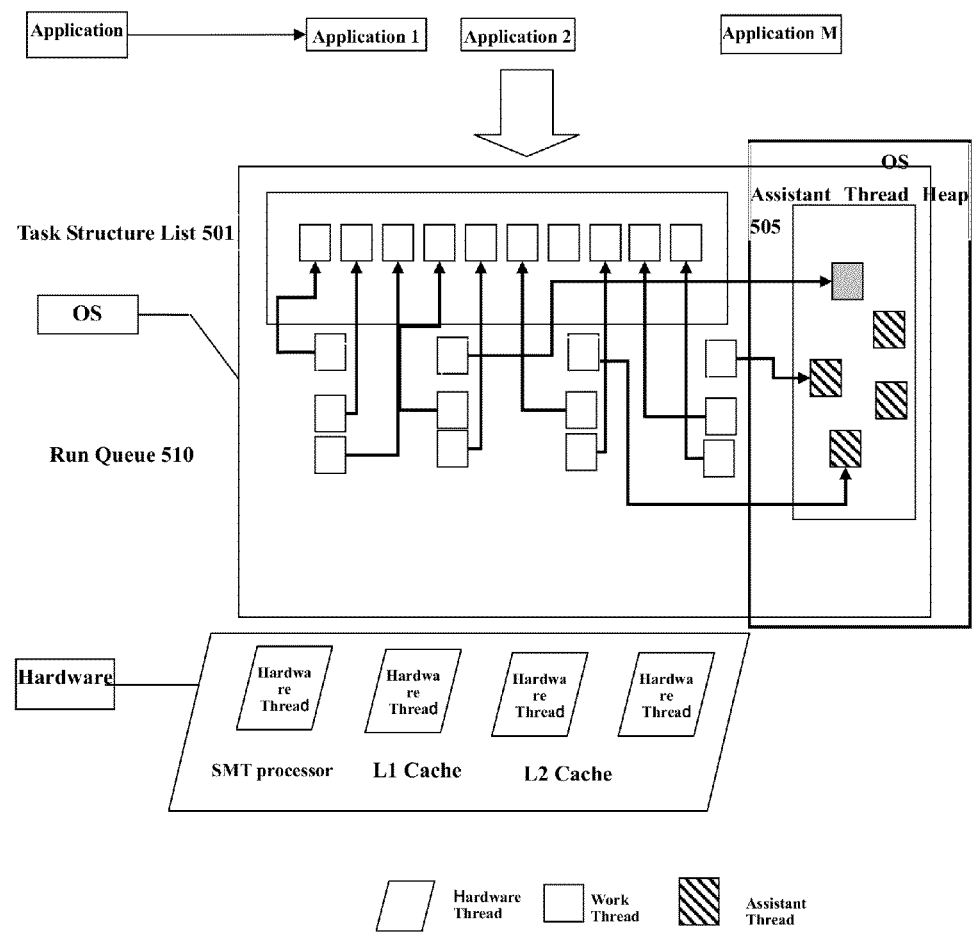
FIG. 5A is a system architecture schematic diagram describing the concomitance scheduling for a single work thread and assistant threads associated therewith in a multi-core/multi-threading processor system according to a particular embodiment of the invention.
Figure 5B:
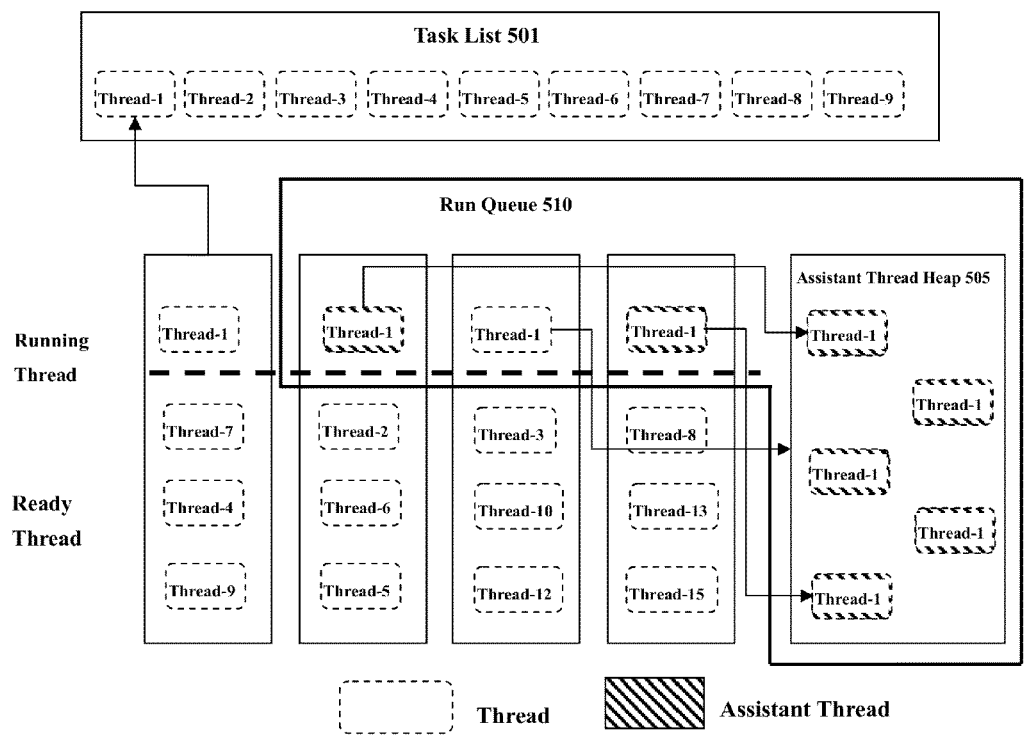
FIG. 5B is a partial schematic diagram of scheduling module for concomitance scheduling in the system architecture shown in FIG. 5A.

FIG. 5A is a system architecture schematic diagram describing the concomitance scheduling for a single work thread and assistant threads associated therewith in a multi-core/multi-threading processor system according to a particular embodiment of the invention; FIG. 5B is a partial schematic diagram of scheduling module for concomitance scheduling in the system architecture shown in FIG. 5A. The scheduling module is constructed on the basis of scheduling modules of traditional operating systems. It can be appreciated by those skilled in the art that, for a plurality of applications to be run, such as Application 1, Application 2, ..., and Application M, in multi-core/multi-threading based operating systems, data is shared between hardware threads using L2 and L3 caches by a SMT processor. As shown in FIG. 5A, the scheduling module according to the preferred embodiment includes: a task list sub-module 501 for creating corresponding task structure for a work thread when the work thread is created; an assistant thread heap sub-module 505 for creating corresponding task structure for the assistant thread of a work thread; and run-queue 510 for indicating and scheduling a work thread and assistant threads associated with the running of the work thread.

According to the invention, for each task structure, the task list sub-module 501 facilitates the operating system to manage and scheduling of assistant threads of the work thread, e.g., by adding several new fields as follows. In particular, refer to FIG. 6, which is a schematic diagram of the task structure modified in the task list of operation system according to the embodiment in FIG. 5 of the invention. In this embodiment, the modified task structure list includes the following fields.

An IsAT field indicates whether the thread is an assistant thread with a Boolean logical value, wherein if the Boolean value "IsAT" is "true", it indicates that the thread is an assistant thread when the thread is being created; otherwise, if the Boolean value "IsAT" is "false", it indicates that the thread is a work thread instead of an assistant thread when the thread is being created. Particularly, when the created thread is an assistant thread, the operation of creating the structure of the assistant thread is performed accordingly, as described in detail below. When the created thread is a work thread, the operation of creating the structure of the work thread will proceed.

A HasAT field indicates whether the work thread has assistant thread(s) with a Boolean logical value, wherein if the Boolean value "HasAT" is "true", it indicates that the work thread has assistant thread(s) when the work thread is being created; otherwise, if the Boolean value "HasAT" is "false", it indicates that the work thread has not any assistant threads when the work thread is being created.

Figure 6:
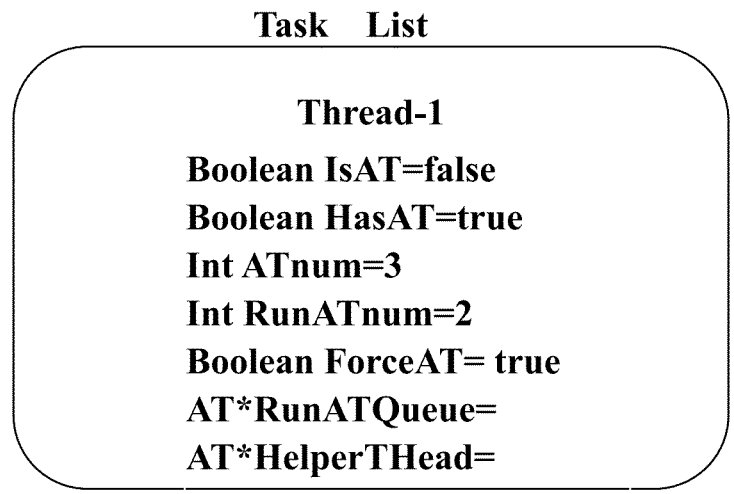
FIG. 6 is a schematic diagram of the task structure modified in the task list of operation system according to the embodiment in FIG. 5 of the invention.

An ATnum field indicates the number of assistant threads which belong to the work thread. Particularly, when the value of HasAT is "false", the value of ATnum is zero. In FIG. 6, the value of ATnum field is 3, which indicates the number of assistant threads which belong to the work thread is 3. More preferably, in the task structure list of work thread according to the invention, it may also include a RunATnum field, which indicates the number of assistant threads actually needed in running the work thread. In FIG. 6, the value of RunATnum field is 2, which indicates the number of assistant threads actually needed in running the work thread is 2.

A ForceAT field indicates whether the work thread needs assistant thread with a Boolean logical value. If the value of ForceAT is "false", operating system will not start assistant threads in certain cases. On the contrary, if the value of ForceAT is "true", operating system will begin to call on assistant threads in any case.

"AT*HelperTHead" field is a pointer that points to the first assistant thread structure of the work thread.

Additionally, as the task list in prior art, the task list of the work thread according to the invention also includes "AT*RunATQueue" field, which is a pointer that points to the run-queue in which the work thread is located.

Figure 7:
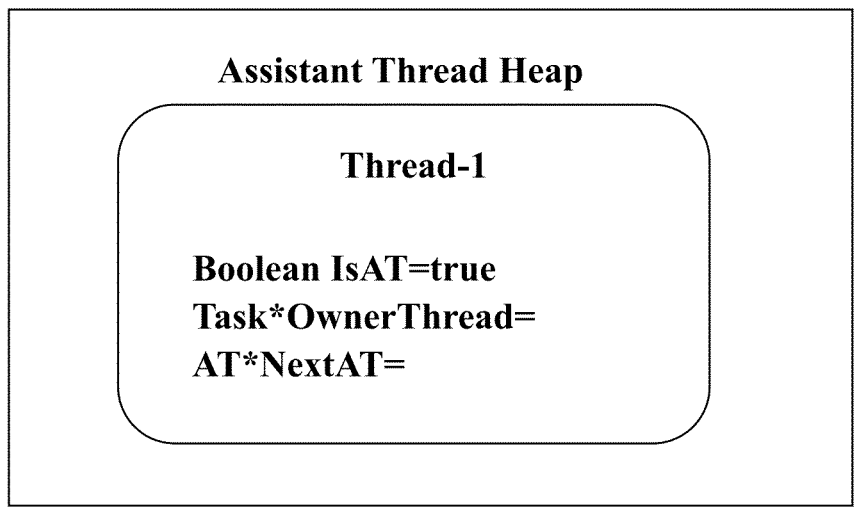
FIG. 7 is a schematic diagram of the assistant thread structure created in assistant thread heap according to the embodiment in FIG. 5 of the invention.

FIG. 7 is a schematic diagram of the assistant thread structure created in assistant thread heap 505 according to the embodiment in FIG. 5 of the invention. It will be understood that the task structures of all assistant threads are stored in the assistant thread heap. An association is defined between each assistant thread and its associated work thread in order for operating system to be capable of calling on and managing assistant threads of the work thread conveniently and rapidly when running the work thread. In particular, the new assistant thread structure created for each assistant thread includes:

An IsAT field, which indicates whether the thread is an assistant thread with a Boolean logical value, wherein if the Boolean value "IsAT" is "true", it indicates that the thread is an assistant thread when the thread is being created; otherwise, if the Boolean value "IsAT" is "false", it indicates that the thread is a work thread instead of an assistant thread when the thread is being created. Particularly, when the created thread is an assistant thread, the operation of creating the structure of the assistant thread will proceed.

An OwnerThread field indicates the work thread to which the assistant thread belongs. By means of this field, it is easy to find the work thread to which the assistant thread belongs.

A NextAT field indicates another assistant thread that belongs to the same work thread. By means of this field, it is easy to find other assistant threads of the same work thread.

It will be understood by those skilled in the art that assistant thread is different from normal work thread. It only exercises a great influence on performance of work thread rather than causes the correctness problems. So operating system could release the memory stored with assistant threads easily, e.g., release the resources in assistant thread heap in this embodiment, when system resources such as memory or processor are spare.

Figure 8:
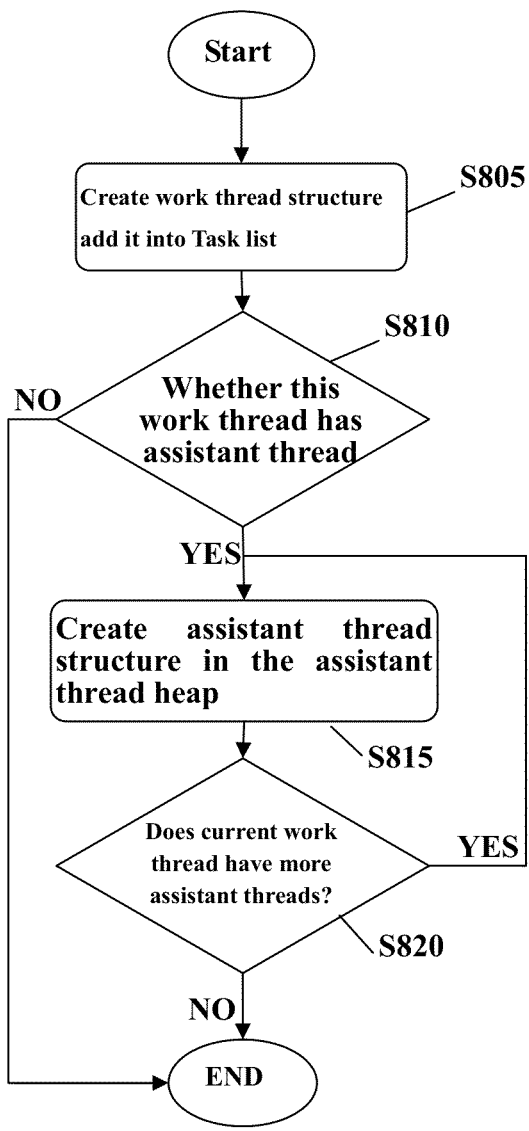
FIG. 8 is a flowchart of the operation of creating assistant threads according to the embodiment in FIG. 5 of the invention.

FIG. 8 is a flowchart showing the operation of creating assistant threads according to the embodiment in FIG. 5 of the invention. First in step S805, for one work thread, the operating system creates corresponding task structure for the work thread, and adds the created task structure of the work thread into the task list of operating system. Next, in step S810, the operating system will check whether the work thread has assistant threads. If the check result of step S810 is "No", the operation of creating assistant threads ends, and the flow ends. If the check result of step S810 is "Yes", it indicates that the work thread has assistant thread. In this case, the process proceeds to step S815 where operating system creates a new task structure in assistant thread heap for one of assistant threads of the work thread. Next, it is further determined whether the work thread has more assistant threads in step S820. If it is "No", the operation of creating assistant threads ends, and the flow ends. Otherwise, if current work thread has more assistant threads, repeating step S815 where operating system creates a new task structure in assistant thread heap for the next assistant thread of the work thread, until all assistant threads belong to the work thread are created.

Figure 9:
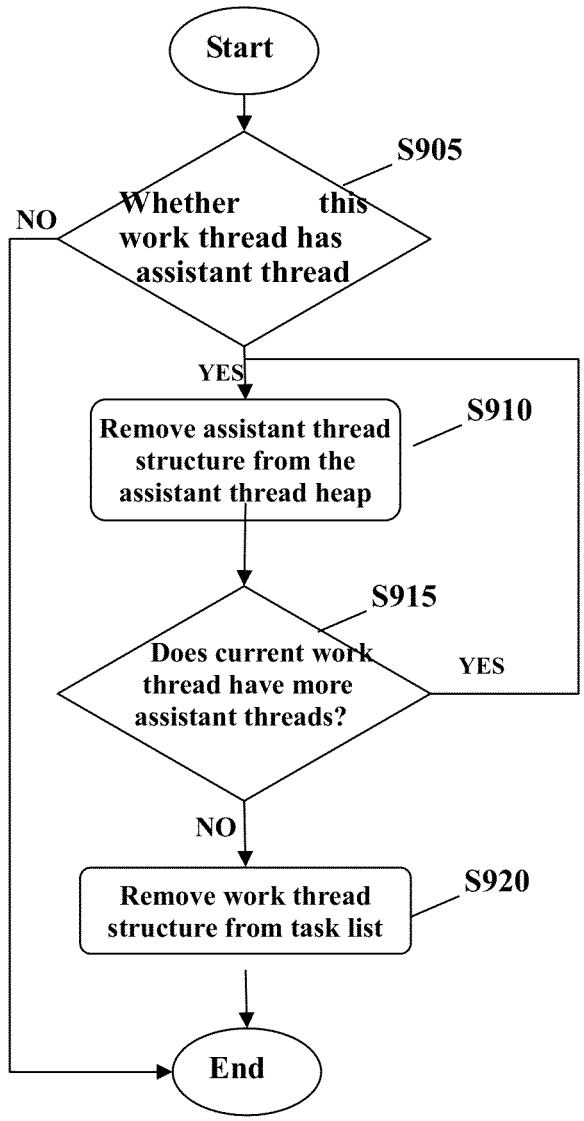
FIG. 9 is a flowchart of the operation of removing assistant threads according to the embodiment in FIG. 5 of the invention.

FIG. 9 is a flowchart showing the operation of removing assistant threads according to the embodiment in FIG. 5 of the invention. When it is desired to remove assistant threads for one work thread, the operating system first checks whether the work thread has assistant thread in step S905. If the check result of step S905 denotes the work thread does not have assistant thread, the operation of removing assistant threads ends, and the flow ends. Otherwise, if the check result of step S905 denotes the work thread has assistant thread, the process proceeds to step S910 where operating system removes assistant thread structure from assistant thread heap. Next, it is further determined whether the work thread has more assistant threads in step S915. If it is "No", the operation of removing assistant threads ends, and the flow ends. Otherwise, if current work thread has more assistant threads, repeating step S910 where operating system removes the task structure of the next assistant thread of the work thread from assistant thread heap, until the determination result of step S915 denotes current work thread does not have more assistant threads. In this case, the process proceeds to step S920 where operating system removes the task structure of the work thread from task list at last.

The first preferred embodiment has been described in detail with reference to FIGS. 5-9 above, and it has presented module structure diagrams and method flowcharts of the operation of presetting the structure of each work thread in the task list of the operating system and setting the structures of assistant threads associated with the work thread in the assistant thread heap of operating system so that the work thread and the assistant threads associated therewith are correlated. For a single work thread, by pre-fetching its assistant thread and creating corresponding task structure of assistant thread in assistant thread heap, the running speed of single thread is improved and the system resources of CPU are saved.

In a second embodiment of the invention, the association between work thread and its corresponding assistant thread is stored in the form of lookup table to achieve the concomitance scheduling between work thread and the assistant thread associated therewith. According to the second embodiment, the way in the first embodiment in which assistant thread is pre-fetched and the created assistant thread structure is independently stored in assistant thread heap is not adopted. According to the second embodiment, when the operating system creates a work thread and associated assistant thread, the adopted structures of work thread and assistant thread are still like those in the first embodiment, the difference lies in that, according to the second embodiment, the lookup table is used to store the association between work thread and its assistant thread, e.g., for a work thread, its assistant thread's address information is stored. According to the second embodiment, the running speed of a single thread is improved and the system resources of CPU are conserved also.

Accordingly, when removing assistant thread, assistant thread is removed by searching the association between work thread and assistant thread in the lookup table, and work thread is removed at last.

FIGS. 10A-I are state transition diagrams of run-queues during operating system concomitance schedules a single work thread and assistant threads associated therewith in a multi-core/multi-threading processor system according to the invention. According to this embodiment, in the run-queues of operating system, the pointer sequences that point to different tasks are maintained. The operating system will construct a run-queue for each processor core/thread. FIGS. 10A-I show run-queues including two indices. The first index shown as "Current" in these figures) points to the running thread in the run-queue. The second index (shown as "Next" in these figures) points to the thread to be scheduled in the run-queue. Each run-queue also includes tags denoting which kind of threads (work thread or assistant thread) is running on the processor core/hardware thread.

Figure 11:
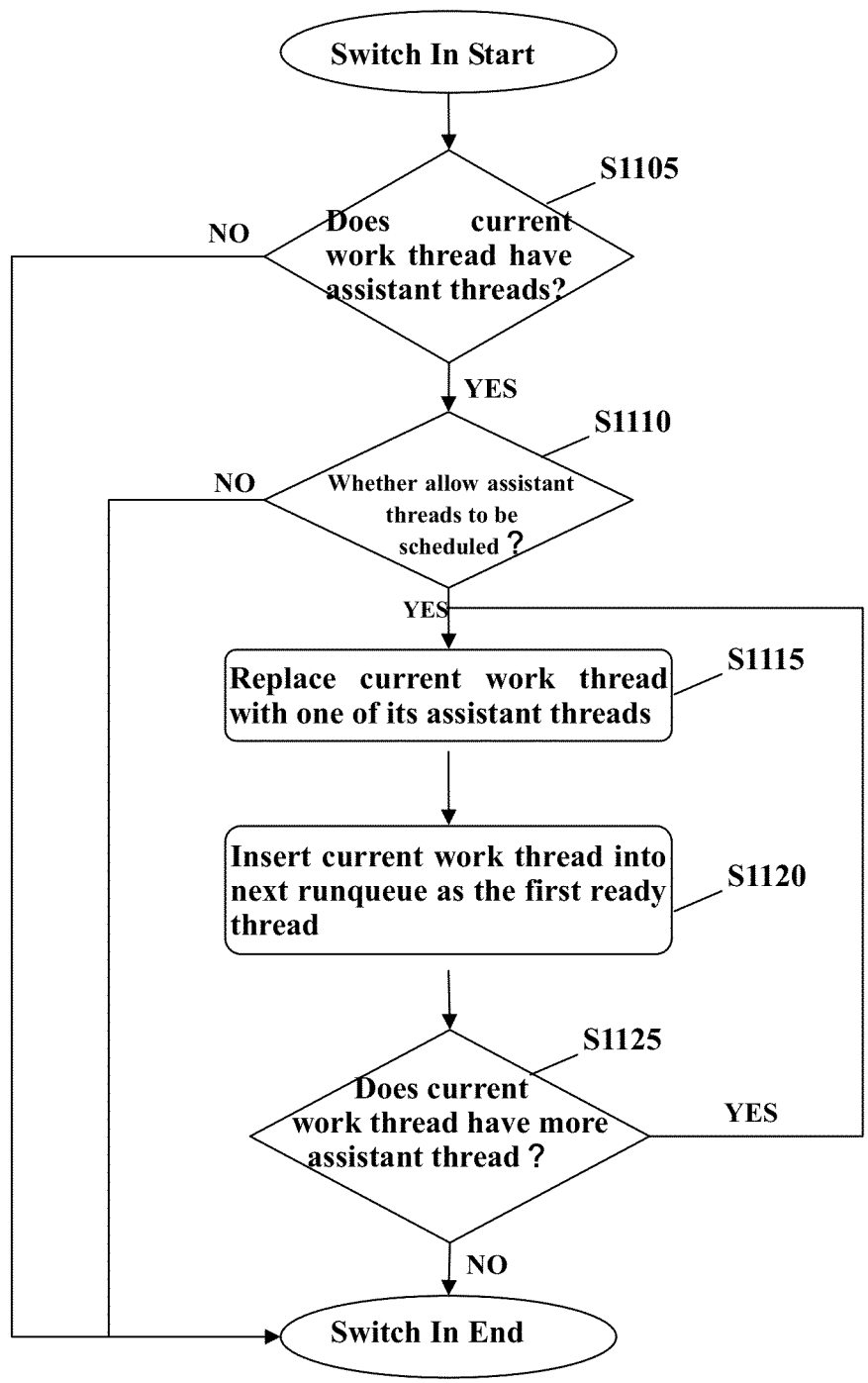
FIG. 11 is an operation flowchart of the method of concomitance scheduling a single work thread and assistant threads associated therewith in multi-core/multi-threading processor system according to the invention.

Description will be given with reference to the state transition diagram of FIG. 11 below. FIG. 11 is an operation flowchart of the method of concomitance scheduling a single work thread and assistant threads associated therewith in a multi-core/multi-threading processor system according to the invention. When one work thread begins to run or be scheduled:

In step S1105, it is first determined whether the work thread has assistant threads. If the determination result of step S1105 is "No", it denotes that the work thread need not to be scheduled, the concomitance scheduling method ends and the work thread begins to run as a normal thread. Otherwise, if the determination result of step S1105 is "Yes", the process proceeds to step S1110.

In step S1110, it is further determined whether assistant threads of the work thread are allowed to be scheduled. If the determination result of step S1110 is "No", it denotes that assistant threads of the work thread are not allowed to be scheduled. Otherwise, if the determination result of step S1110 is "Yes", the process proceeds to step S1115.

In step S1115, the work thread to be run in run-queue is replaced by one of the assistant threads associated with the running of the work thread, and this assistant thread is run.

Referring again to FIG. 10A, work thread 1 is used as the example, and the description is given on the basis of a four-core processor system. When the second index indicates work thread 1 as the thread to be scheduled in run-queue(the first run-queue), the assistant thread scheduling operation of the invention starts.

Figure 10A:
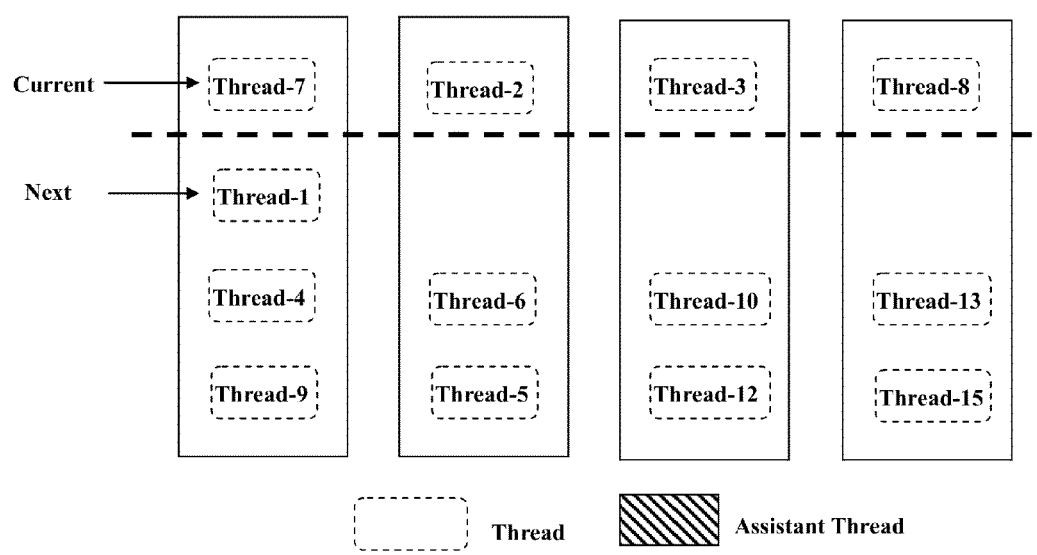
FIGS. 10A-I are schematic diagrams of run-queues during operating system concomitance schedules a single work thread and assistant threads associated therewith in multi-core/multi-threading processor system according to the invention.
Figure 10B:
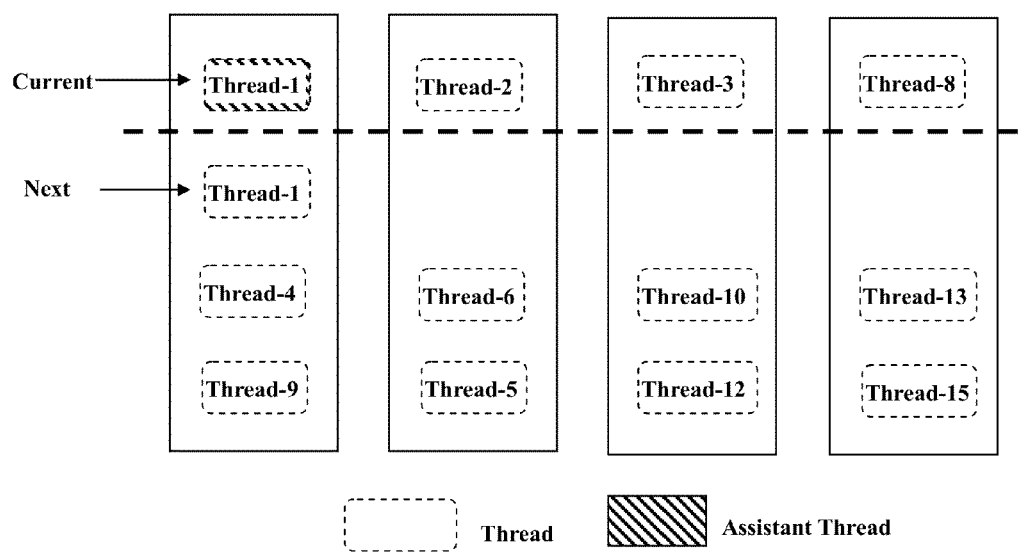

When the running thread in run-queue (thread 7 in FIG. 10A) finishes running and thread 1 is to be run in the run-queue, work thread 1 to be run in run-queue is replaced by one of the assistant threads associated with the running of the work thread 1, such as the first assistant thread, and the first assistant thread is run, as shown in FIG. 10B.

Figure 10C:
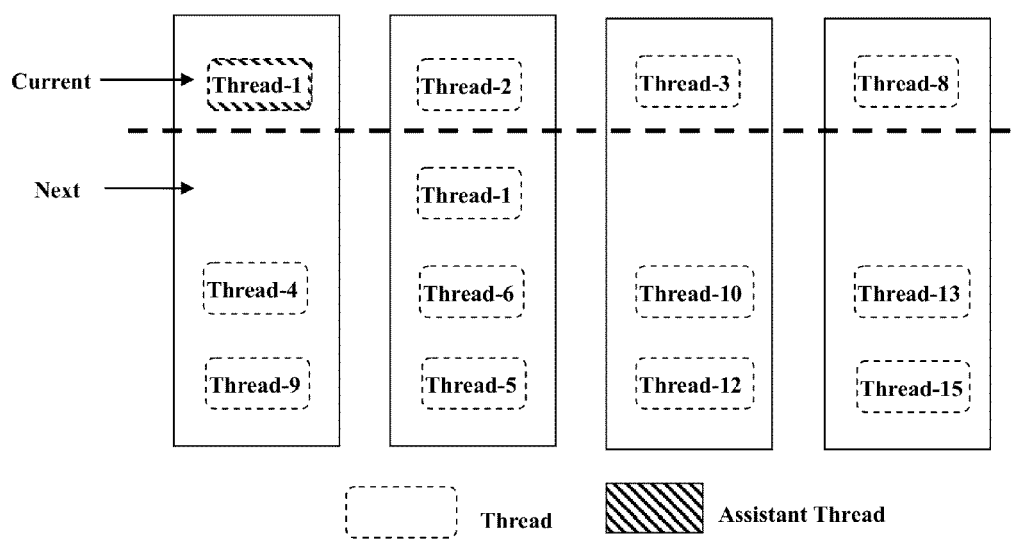
Figure 10D:
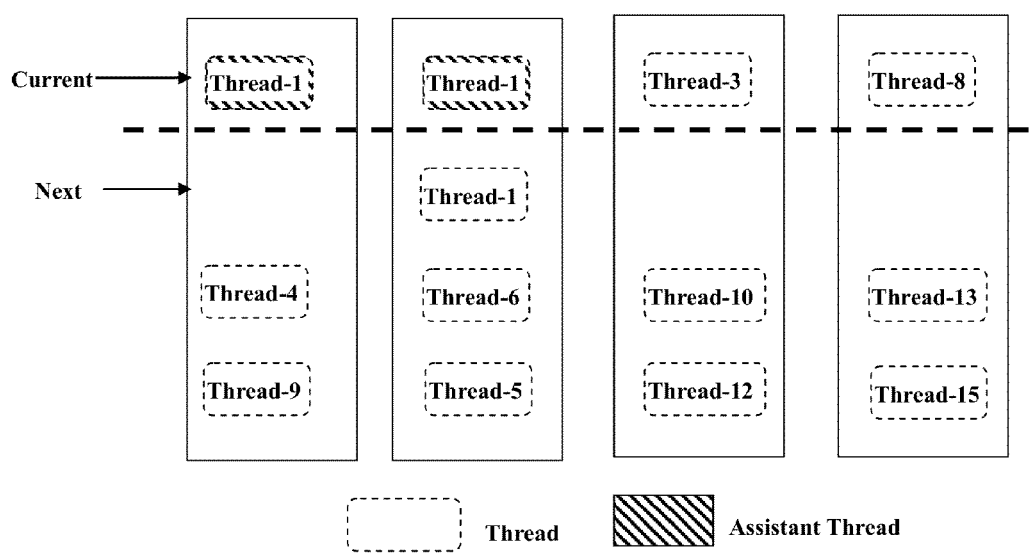
Figure 10E:
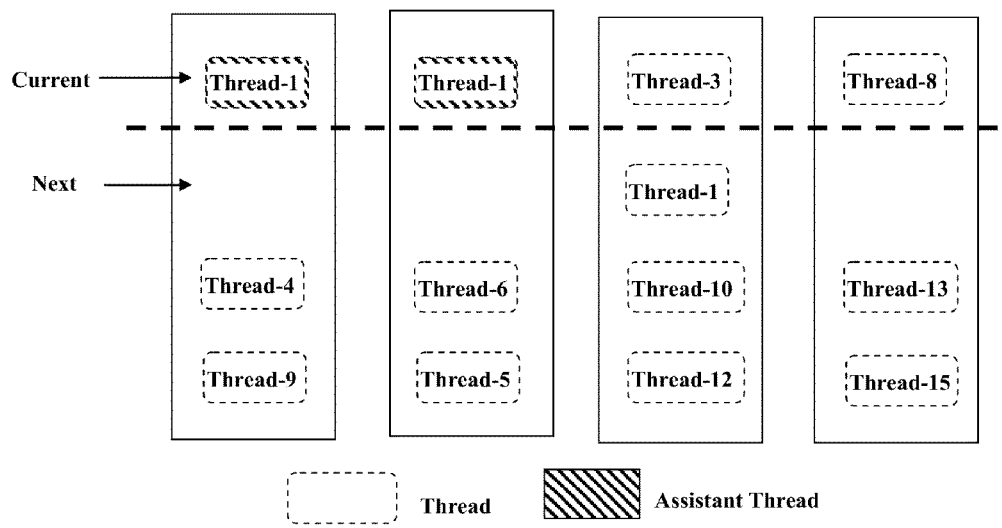
Figure 10F:
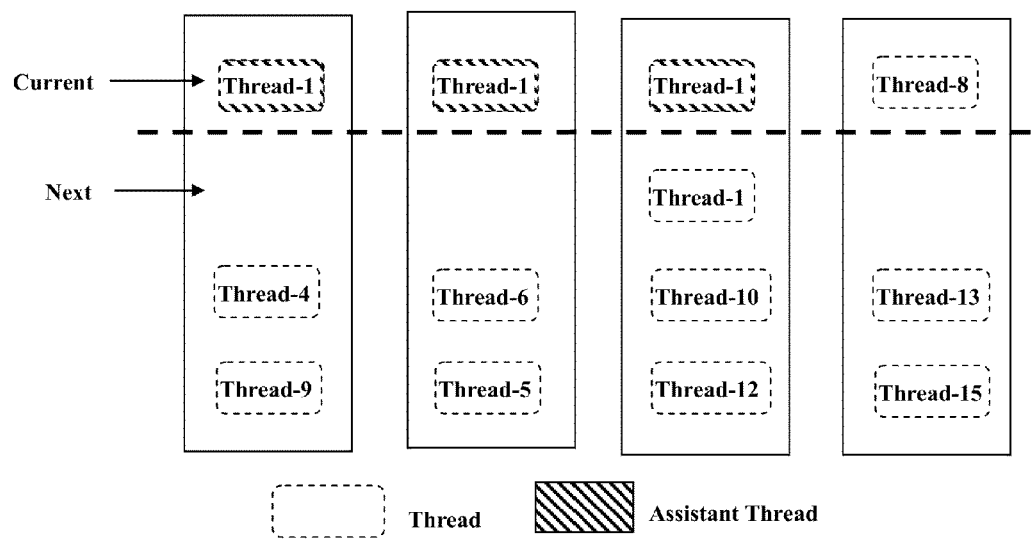
Figure 10G:
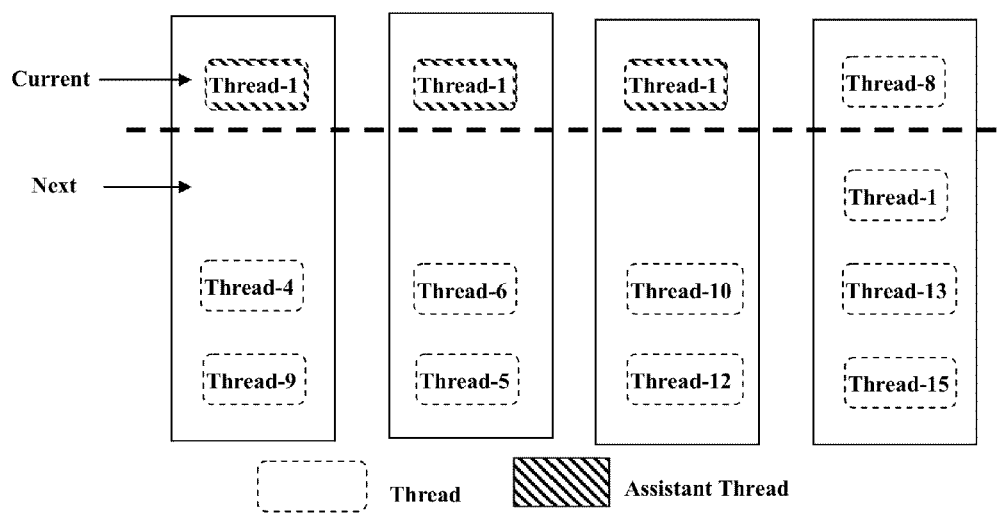
Figure 10H:
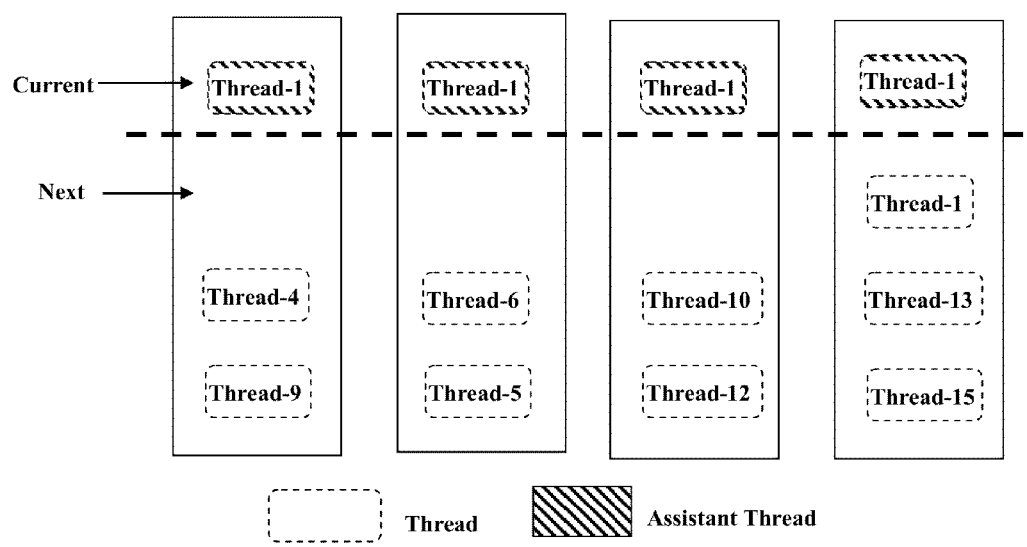

Next, the process proceeds to step S1120, the work thread 1 is disposed at the position of the thread to be scheduled in the next run-queue (i.e., the second run-queue). Referring to FIG. 10C, at this time, work thread 1 is disposed at the position of the thread to be scheduled in the next run-queue (the second run-queue) so that the work thread could be first run at the next moment. That is to say, current work thread 1 is inserted into the next run-queue as the first ready thread.

Then, the process proceeds to step S1125 where it is further determined whether the work thread has more assistant threads.

When the determination result of step S1125 is "Yes", the process repeats steps S1115 and S1120, until all assistant threads associated with the running of the work thread begin to run.

Figure 10I:
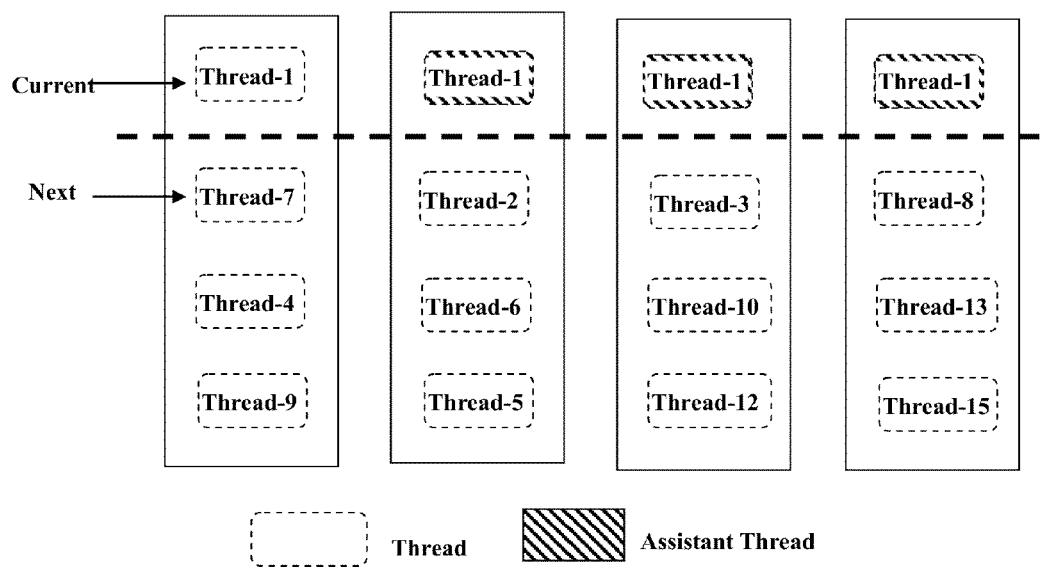

Referring to FIGS. 10D-10H, when the work thread 1 is to be run in the next run-queue (i.e., the second run-queue), the work thread 1 to be run in the next run-queue (i.e., the second run-queue) is replaced by the next one of the assistant threads associated with the running of the work thread, and the next assistant thread is run. It is very easy to find the next assistant thread of the current assistant thread by the "NextAt" field in the created assistant thread structure. It can be seen from FIGS. 10D-10H that, when work thread 1 is disposed in turn at the head of the third, fourth run-queues, the work thread at the head of the third, fourth run-queues is in turn replaced by the next third, fourth one of the assistant threads associated with the running of the work thread accordingly, and the corresponding assistant thread is run. After all assistant threads associated with the running of the work thread begin to run, the work thread 1 begins to run, as shown in FIG. 10I.

When the determination result of step S1125 is "No", the process ends.

Accordingly, when work thread stops running, the system will remove all assistant threads from each run-queue and make the Next pointer to point to the next work thread.

Figure 12:
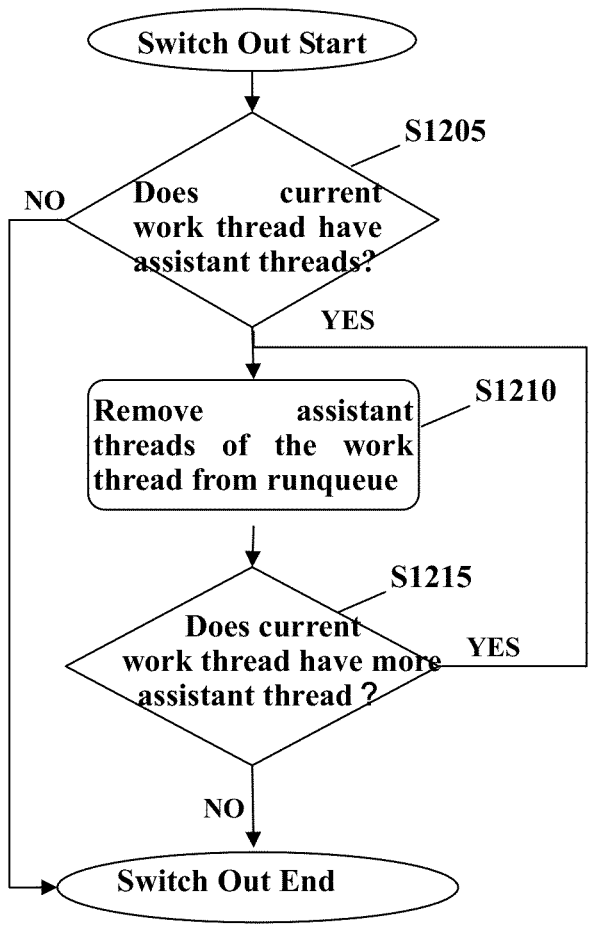
FIG. 12 is a flowchart of stopping running the work thread in multi-core/multi-threading processor system according to the invention.

FIG. 12 is a flowchart of stopping running the work thread according to the invention. FIG. 12 is a process for the work thread to be switched out by scheduling module. When the work thread is about to be switched out by scheduling module (interrupted by another thread or the time slice ran out), scheduling module will delete all assistant threads from each run-queue and let the Next pointer point to the next work thread. In particular, the process includes the following steps.

In step S1205, it is first determined whether the running work thread has assistant threads. If it is "No", the process ends. Otherwise, if the determination result of step S1205 is "Yes", the process proceeds to step S1210 where the assistant threads of the work thread are removed from run-queues. The process proceeds to step S1215 and further determines whether current work thread has more assistant threads. If it is "Yes", the next assistant thread of the work thread is removed from run queue. After the determination result of step S1215 denotes current work thread does not have any assistant threads, the process of stopping running the work thread ends.

It should be understood that, such illustration is given only for the purpose of making it easy for those skilled in the art to understand the principle of the invention, but not be construed as any limit to the invention.

It will be appreciated by those skilled in the art that, the embodiments of the invention can be provided in the form of a method, a system or a computer program product. Therefore, embodiments of the invention may take the form of pure hardware, pure software, or combined hardware and software. The typical combination of hardware and software may be a general purpose computer system with computer program. When the program is loaded and executed, the computer system is controlled to perform the above method.

The invention can be embedded in a computer program product, which includes all features that allow the method described herein to be embodied. The computer program product is included in one or more computer readable storage media (including, but not limited to, magnetic disk storage, CD-ROM, optical storage, etc), the computer readable storage medium has computer readable program code stored therein.

The invention has been described with reference to the flowcharts and block diagrams of method, system and computer program product according to the invention. Each block in the flowcharts and block diagrams and the combination of blocks in the flowchart and/or block diagram can be implemented by computer program instructions. These computer program instructions can be provided to the processor of general purpose computer, dedicated computer, embedded processor or other programmable data processing apparatus to generate a machine, so that the instructions (by the processor of computer or other programmable data processing apparatus) generate a means for implementing the functions provided in one or more blocks of the flowchart and/or block diagram.

These computer program instructions can also be stored in read memories of one or more computers, each of such memories can instruct computer or other programmable data processing apparatus to put into effect in a particular manner, so that the instructions stored in computer readable memory produce a manufacture article. The manufacture article includes an instruction device that implements functions provided in one or more blocks of the flowchart and/or block diagram.

The computer program instructions can also be loaded into one or more computers or other programmable data processing apparatus such that a series of operation steps is executed on the computer or other programmable data processing apparatus, thereby a computer-implemented process is generated on each of such apparatus, resulting in that the instructions executed on the apparatus provide a method for implementing the steps provided in one or more blocks of the flowchart and/or block diagram.

While the present invention has been described in connection with the preferred embodiments of the invention above, these descriptions are only illustrative, but not to be construed as limitations to the invention. Those skilled in the art will recognize they can make modifications and variations without departing from the spirit and scope of the invention as defined by the appended claims.

What is claimed is:

1. A method, for concomitance scheduling a work thread and assistant threads associated with the work thread in a multi-threading processor system, the method comprising:
    searching one or more assistant threads associated with the running of the work thread when preparing to run/schedule the work thread;
    running the one or more assistant threads that are searched; and
    running the work thread after all of the one or more assistant threads associated with the running of the work thread have run,
    wherein running the one or more assistant threads further comprises:
    replacing the work thread to be run in run-queue with one assistant thread of the assistant threads associated with the running of the work thread, and running said one assistant thread;
    disposing the work thread at the position of the thread to be scheduled in the next run-queue;
    when the work thread is about to be run in said next run-queue, replacing the work thread to be run with the next assistant thread of the assistant threads associated with the running of the work thread, and running said next assistant thread; and repeating the above steps, until all assistant threads associated with the running of the work thread have run.

2. The method according to claim 1, further comprising:
presetting the structures of the work thread and assistant threads associated with the work thread by the operating system such that the work thread and assistant threads associated therewith are correlated.

3. The method according to claim 2, wherein presetting the structure of the work thread by the operating system further comprises adding the following information to task list of the operating system for each of the work threads:
whether the work thread has any assistant threads, and the number of assistant threads belonging to the work thread;
whether any assistant threads are needed while running the work thread, and the number of assistant threads that are needed; and
a pointer pointing to the first one of assistant threads associated with the running of the work thread.

4. The method according to claim 2, wherein presetting the structures of assistant threads associated with the work thread by the operating system further comprising adding the following information for each assistant thread:
a pointer pointing to the work thread to which the assistant thread belongs; and
a pointer pointing to the next assistant thread which belongs to the same work thread.

5. The method according to claim 1, further comprising:
predetermining assistant threads associated with the work thread;
fetching the determined assistant threads associated with the work thread; and
storing the fetched assistant threads associated with the work thread in a separate assistant thread storage area in operating system.

6. The method according to claim 1, further comprising:
predetermining assistant threads associated with the work thread; and
adding the physical addresses of the determined assistant threads associated with the work thread into a lookup table.

7. The method according to claim 1, further comprising:
deleting assistant threads associated with the work thread from each run-queue after the work thread stops running.

8. The method according to claim 1, wherein the multi-threading processor system is a multi-core processor system.

9. An apparatus for concomitance scheduling a work thread and assistant threads associated with the work thread in a multi-threading processor system, the apparatus comprising:
at least one processor for implementing components;
a search component for searching one or more assistant threads associated with the running of the work thread when preparing to run/schedule the work thread; and
a scheduler component for running the one or more assistant threads that are searched;
wherein the scheduling component is further configured to run the work thread after all of the one or more assistant threads associated with the running of the work thread have run, wherein the scheduling component is further configured to:

replace the work thread to be run in run-queue with one assistant thread of the assistant threads associated with the running of the work thread, and run said one assistant thread;
dispose the work thread at the position of the thread to be scheduled in the next run-queue;
when the work thread is about to be run in said next run-queue, replace the work thread to be run with the next assistant thread of the assistant threads associated with the running of the work thread, and run said next assistant thread; and
repeat the above operations, until all assistant threads associated with the running of the work thread have run.

10. The apparatus according to claim 9, wherein the scheduler component further comprises:
a presetting component within the operating system of the multi-threading processor system for presetting the structures of the work thread and assistant threads associated with the work thread such that the work thread and assistant threads associated therewith are correlated.

11. The apparatus according to claim 10, wherein the presetting component is further configured to add the following information to the task list of operating system for each of the work threads:
whether the work thread has any assistant threads, and the number of assistant threads belong to the work thread;
whether any assistant threads are needed while running the work thread, and the number of assistant threads that are needed; and
a pointer pointing to the first one of assistant threads associated with the running of the work thread.

12. The apparatus according to claim 10, wherein the presetting component is further configured to add the following information for each assistant thread:
a pointer pointing to the work thread to which the assistant thread belongs; and
a pointer pointing to the next assistant thread which belongs to the same work thread.

13. The apparatus according to claim 9, further comprising:
a determining component for predetermining assistant threads associated with the work thread;
a fetching component for fetching the determined assistant threads associated with the work thread; and
an assistant thread heap in a separate storage area of operating system, which stores the fetched assistant threads associated with the work thread.

14. The apparatus according to claim 9, further comprising:
a determining component for predetermining assistant threads associated with the work thread; and
a lookup table storage device for storing the physical addresses of the determined assistant threads associated with the work thread.

15. The apparatus according to claim 9, further comprising:
a deletion component for deleting assistant threads associated with the work thread from each run-queue after the work thread stops running.

16. The apparatus according to claim 9, wherein the multi-threading processor system is a multi-core processor system.

17. An article of manufacture comprising a non-transitory storage medium containing program instructions for causing a programmable data processing system to perform the method comprising the steps of:

searching at least one assistant thread associated with the running of the work thread when preparing to run/schedule the work thread;

running the assistant threads that are searched; and running the work thread after all of the assistant threads associated with the running of the work thread have run, wherein the step of running the one or more assistant threads further comprises:

replacing the work thread to be run in run-queue with one assistant thread of the assistant threads associated with the running of the work thread, and running said one assistant thread;

disposing the work thread at the position of the thread to be scheduled in the next run-queue;

when the work thread is about to be run in said next run-queue, replacing the work thread to be run with the next assistant thread of the assistant threads associated with the running of the work thread, and running said next assistant thread; and repeating the above steps, until all assistant threads associated with the running of the work thread have run.

18. The article of manufacture of claim 17 further containing instructions for performing the steps of:

predetermining assistant threads associated with the work thread;

fetching the determined assistant threads associated with the work thread; and storing the fetched assistant threads associated with the work thread in a separate assistant thread storage area in operating system.

19. The article of manufacture of claim 17 further containing instructions for performing the steps of:

presetting, by the operating system of the multi-threading processor system, the structures of the work thread and assistant threads associated with the work thread such that the work thread and assistant threads associated therewith are correlated.

20. The article of manufacture of claim 17 further containing instructions for performing the steps of:

predetermining assistant threads associated with the work thread; and adding the physical addresses of the determined assistant threads associated with the work thread into a lookup table.

21. The article of manufacture of claim 17 further containing instructions for performing the steps of:

deleting assistant threads associated with the work thread from each run-queue after the work thread stops running.

* * * * *